US010481995B1

(12) United States Patent
Mandali et al.

(10) Patent No.: US 10,481,995 B1
(45) Date of Patent: Nov. 19, 2019

(54) METHODS AND SYSTEMS FOR MEASURING USER AND SYSTEM METRICS

(71) Applicant: Capital One Services, LLC, McLean, VA (US)

(72) Inventors: Venkata Mandali, Glen Allen, VA (US); Sateesh Mamidala, Glen Allen, VA (US); Arunkumar Natarajan, Glen Allen, VA (US); Kadhiresan Kanniyappan, Ashburn, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/233,432

(22) Filed: Dec. 27, 2018

Related U.S. Application Data

(60) Provisional application No. 62/719,514, filed on Aug. 17, 2018.

(51) Int. Cl.
| | | |
|---|---|---|
| G06F 15/16 | (2006.01) |
| G06F 11/34 | (2006.01) |
| H04L 29/08 | (2006.01) |
| G06F 16/957 | (2019.01) |
| G06F 11/07 | (2006.01) |

(52) U.S. Cl.
CPC ........ *G06F 11/3495* (2013.01); *G06F 11/079* (2013.01); *G06F 11/3423* (2013.01); *G06F 11/3476* (2013.01); *G06F 16/9577* (2019.01); *H04L 67/22* (2013.01); *G06F 2201/875* (2013.01)

(58) Field of Classification Search
CPC ............. G06F 11/3495; G06F 16/9577; G06F 11/079; G06F 11/3423; G06F 11/3476; G06F 2201/875; H04L 67/22
See application file for complete search history.

(56) References Cited

U.S. PATENT DOCUMENTS

| | | | | |
|---|---|---|---|---|
| 6,760,916 B2 * | 7/2004 | Holtz | ..................... | G06Q 30/06 348/E5.022 |
| 7,502,858 B2 * | 3/2009 | Gupta | ..................... | H04L 12/14 709/226 |
| 7,765,295 B2 | 7/2010 | Anastas et al. | | |

(Continued)

OTHER PUBLICATIONS

AppDynamics: Browser Real User Monitoring; https://docs.appdynamics.com/display/PRO43/Browser+Real+User+Monitoring (last accessed Dec. 26, 2018).

*Primary Examiner* — Moustafa M Meky
(74) *Attorney, Agent, or Firm* — Troutman Sanders LLP; Christopher J. Forstner; John A. Morrissett

(57) ABSTRACT

A method including receiving, from a user device, a user request to access data associated with a web page; generating, by a processor, a first transaction identification; collecting transaction information, the transaction information comprising server-side metrics; integrating, by the processor, the first transaction identification with the transaction information; transmitting, by the processor, the first transaction identification to the user device; receiving, from the user device, client-side data associated with a second transaction identification; integrating, by the processor, the server-side metrics and the client-side data; and analyzing, by the processor, the integrated server-side metrics and the client-side data.

15 Claims, 8 Drawing Sheets

(56) References Cited

U.S. PATENT DOCUMENTS

| | | | | |
|---|---|---|---|---|
| 8,032,626 | B1* | 10/2011 | Russell | H04L 69/329 |
| | | | | 709/223 |
| 8,250,177 | B2* | 8/2012 | Honein | G06F 16/9574 |
| | | | | 709/218 |
| 8,543,537 | B2* | 9/2013 | MacLean | G06Q 10/087 |
| | | | | 707/607 |
| 9,330,051 | B1* | 5/2016 | Martin | G06F 15/173 |
| 2002/0053078 | A1* | 5/2002 | Holtz | G06Q 30/06 |
| | | | | 725/14 |
| 2002/0099818 | A1* | 7/2002 | Russell | H04L 67/02 |
| | | | | 709/224 |
| 2003/0131052 | A1* | 7/2003 | Allan | H04L 29/06 |
| | | | | 709/203 |
| 2006/0085420 | A1 | 4/2006 | Hwang | |
| 2006/0294223 | A1* | 12/2006 | Glasgow | H04L 67/2847 |
| | | | | 709/224 |
| 2007/0271375 | A1 | 11/2007 | Hwang | |
| 2008/0228910 | A1 | 9/2008 | Petri | |
| 2009/0327404 | A1* | 12/2009 | Honein | G06F 16/9574 |
| | | | | 709/203 |
| 2018/0034721 | A1* | 2/2018 | Dunn | H04L 67/02 |
| 2018/0253373 | A1* | 9/2018 | Mathur | G06F 11/3692 |

* cited by examiner

METHODS AND SYSTEMS FOR MEASURING USER AND SYSTEM METRICS

CROSS-REFERENCE TO RELATED APPLICATION

This Application claims the benefit, under 35 U.S.C. § 119(e), of U.S. Provisional Patent Application No. 62/719,514, filed Aug. 17, 2018, the contents of which are hereby incorporated by reference herein in their entirety as if fully set forth below.

FIELD

The presently disclosed subject matter relates generally to measuring user and system metrics and, more particularly, to systems and methods for identifying and analyzing correlations amongst system metrics and conditions.

BACKGROUND

The immense number of users of the internet and the tremendous number of platform offerings and content providers require advanced client-server management solutions. Conventional client-server management solutions for measuring and testing the performance of web sites by monitoring web pages suffer from a variety of deficiencies. For example, conventional client-server management solutions for monitoring web pages are limited in that conventional technologies do not capture the end user's experience on the web page and are unable to gauge performance of web page operation. Moreover, related art methods for measuring system metrics are unable to identify system issues based on an individual or a group of individuals, or provide metrics based on user location. Accordingly, there is a need for an improved system and method for measuring user and system metrics.

More specifically, a need exists for analyzing and identifying system problems on an individual and/or group of individuals basis, and/or further based on system access location.

SUMMARY

Aspects of the disclosed technology include systems and methods for measuring user and system metrics. Consistent with the disclosed embodiments, the systems and methods may utilize one or more user devices, processors, web servers, and databases. In some cases, certain systems and methods may include a processor receiving a user request to access data associated with a web page. The processor may generate a first transaction identification. The processor may collect transaction information comprising server-side metrics. The processor may integrate the transaction information with the first transaction identification. The processor may transmit the first transaction identification to the user device. The processor may receive client-side data associated with a second transaction identification from the user device. The processor may integrate the server-side metrics and the client-side data. Further, the processor may analyze the integrated server-side metrics and the client-side data.

In some embodiments, the processor may determine one or more servers accessed in response to the user request. The processor may record each internet protocol (IP) address and/or central processing unit (CPU) utilization percentage of the one or more servers accessed. Further, each IP address and/or CPU utilization percentage recorded may be associated with the server-side metrics. According to some embodiments, the processor may determine an amount of time to return the requested data associated with the web page to the user device. The amount of time to return the requested data associated with the web page may be associated with the server-side metrics.

In some embodiments, the client-side data may include a customer identification, a browser type, an operating system type, a web page load time, a graphical user interface (GUI) identification, a user geographical location, and/or the like.

According to some embodiments, the processor may determine the second transaction identification associated with the client-side data. The processor may compare, for a match, the first transaction identification and the second transaction identification. Further, in response to finding a match, the processor may generate a dataset comprising the server-side metrics and the client-side data. The transaction information may be stored on a first storage device. The client-side data may be stored on a second storage device. In some embodiments, the method may include receiving an indication of the status of the user request from the user device. The user request may include a successful status indication or a failed status indication. The processor may identify a source of the failed status indication. Further, the source of the failed status indication, and the client-side data and the server-side metrics corresponding to the first transaction identification may be stored.

The historic data may include a plurality of client-side data and/or a plurality of server-side metrics. In some embodiments, the method may include preventing future occurrences of the failed status indication by: comparing the client-side data and the server-side metrics to historic data; identifying whether a correlation between the client-side data and the server-side metrics exists leading to the failed status indication; and when a correlation exists, preventing future occurrences of the failed status indication by eliminating the correlation.

An example embodiment of the present disclosure may include a method for measuring user and system metrics. The method may include a processor transmitting a request to access data associated with a web page. The processor may receive data associated with the web page and/or a transaction identification. The method may further include collecting session information. The session information may include client-side metrics. The processor may associate the session information with the transaction identification. Further, the processor may transmit the session information and the associated transaction identification.

In some embodiments, the client-side metrics may include a customer identification, a browser type, an operating system type, a web page load time, a graphical user interface (GUI) identification, a user geographical location, and/or the like.

According to some embodiments, the processor transmits the session information and the associated transaction identification to a server and/or a storage device. In some embodiments, the processor transmits an indication of the status of the request. The status of the request may include a successful status indication or a failed status indication.

Another example embodiment of the present disclosure may include a system for measuring user and system metrics. The system may include one or more processors and a memory in communication with the one or more processors and storing instructions. When executed by the one or more processors, the memory and stored instructions may be configured to: receive a user request to access data associated with a web page from a user device; generate a first transaction identification; integrate the first transaction identification with the transaction information; transmit the first transaction identification to the user device; receive client-side data associated with a second transaction identification from the user device; integrate the server-side metrics and the client-side data; and analyze the integrated server-side metrics and the client-side data.

In some embodiments, the system may receive an indication of the status of the user request from the user device. The user request may include a successful status indication or a failed status indication. According to some embodiments, the system may prevent future occurrences of the failed status indication by: comparing the client-side data and the server-side metrics to historic data; identifying whether a correlation between the client-side data and the server-side metrics exists leading to the failed status indication; and when a correlation exists, preventing future occurrences of the failed status indication by eliminating the correlation.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
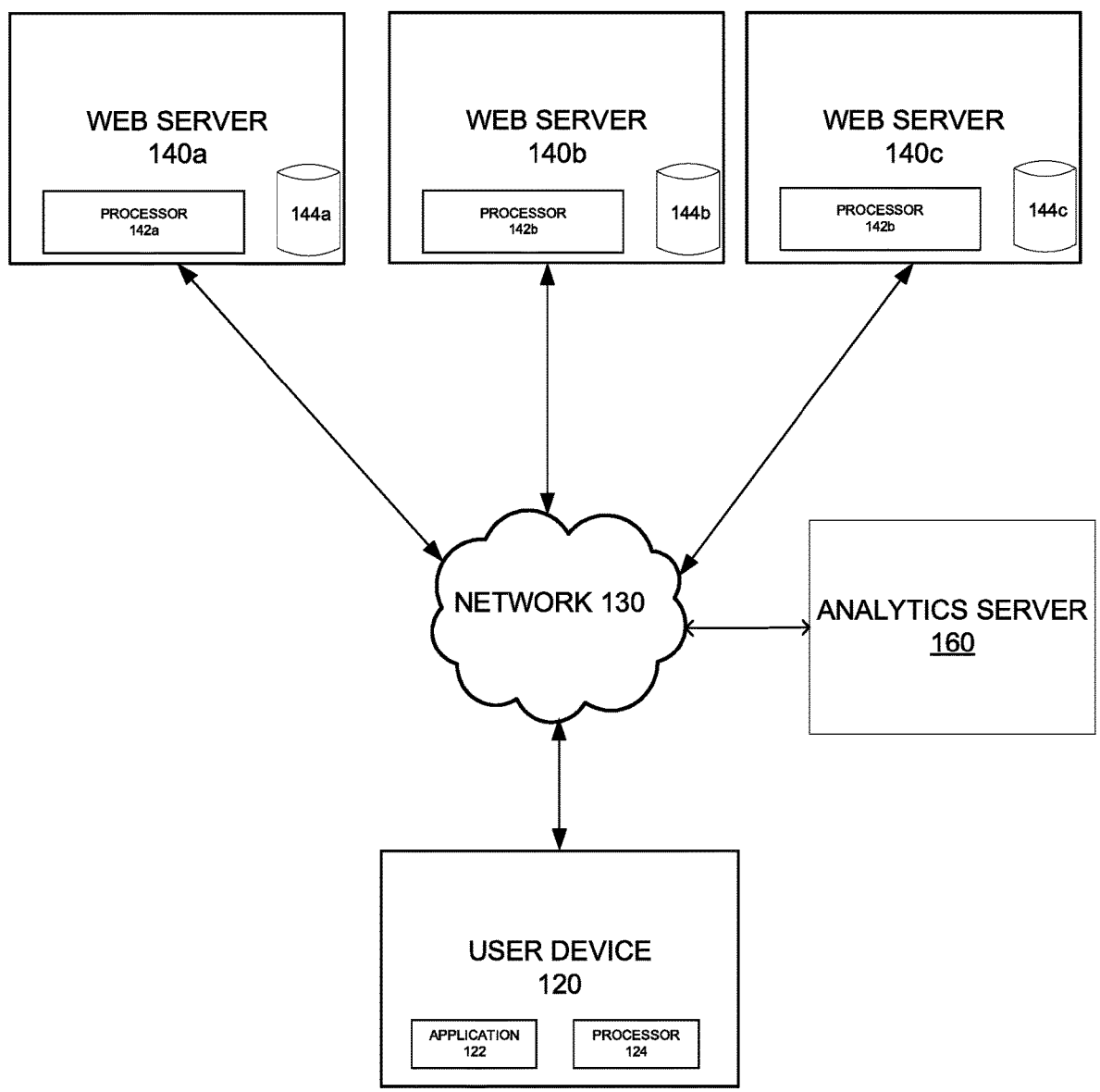
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

In an example scenario, the cause of a system error may be identified. A user inputs or navigates to a web address into a web browser on his user device, which requests access to the web address from a server (e.g., a web server). The server (e.g., web server) receiving the request collects server-side metrics present during the request (e.g., CPU utilization rate, return time for the request, chain of logical and/or physical machines accessed). The server associates a unique transaction identification with the system conditions collected during the request. The server sends the transaction identification (ID) to the user device. Meanwhile, the user device collects client-side metrics present during the request (e.g., customer identification, a browser type, an operating system type, a web page load time, a graphical user interface (GUI) identification, a user geographical location) and transmits the client-side metrics to a second server (e.g., a collector server) along with the transaction ID. The server identifies the server-side metrics corresponding to the client-side metrics based on the transaction ID. Further, the server analyzes the combined data against previous integrated client and server-side data to identify correlations. Based on identified correlations, the server identifies the cause of any errors associated with the request. The CPU utilization, memory utilization, spool usage, list of active tasks, bandwidth, system temperature, and/or the like are examples of server-side metrics and/or client-side metrics that may be evaluated to determine a correlation leading to a system error. The correlation may be as simple as a 1:1 scenario where memory utilization of the server beyond 80% is associated with a specific error such as a time out for a request. In other scenarios, a combination of server-side metrics, a combination of client-side metrics, or a combination of server-side metrics and client-side metrics may correlate to an error. For example, it may be determined that web page requests from Internet Explorer® browsers on devices using the newest Windows® operating system fail to receive requested data when the server is performing more than thirty tasks concurrently. In another example, a correlation may be identified in relation to several server-side metrics. For instance, a CPU utilization rate over 75%, memory utilization over 83%, and more than twenty-five active tasks may lead to an error regardless of the client-side metrics.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows an example of an environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more user devices 120, a network 130, one or more web servers 140a, 140b, and/or 140c which may include respective processors 142a-c, and databases 144a-c, and analytics server 160. In some cases, the one or more web servers 140a-c may be, for example, one or more application servers or web hosts. As non-limiting examples, the user device 120 may be a personal computer, a smartphone, a laptop computer, a tablet, or other personal computing device. The network 130 may include a network of interconnected computing devices more commonly referred to as the internet. Each web server 140*a-c* may include one or more physical or logical devices (e.g., servers). The user device 120 may run and display one or more applications 122. An example computer architecture that may be used to implement one or more of the user device 120, one or more the web server 140*a-c*, and analytics server 160 is described below with reference to FIG. 8.

In certain implementations according to the present disclosure, the user device 120 may include one or more applications 122 and/or one or more processors 124. The one or more applications 122 may provide a graphical display including a field for a user to enter a request to access code associated with a web page. The user request may include a uniform resource locator (URL). In some cases, the user request may be a request to run and/or access a web-based application to be executed on the one or more web servers 140*a-c*. In some embodiments, the processor 124 may receive the user request from the application 122. Accordingly, the processor 124 may output, for transmission, the user request to the web server 140*a*. Outputting, for transmission, the user request from the user device 120 to the web server 140*a* may initiate a session between the user device 120 and the web server 140*a*. In response to the user request, the user device 120 may receive, from the web server 140*a*, data associated with the web page. The data associated with the page may include web page code (e.g., HTML, CSS, Javascript, CGI). The user device 120 may receive a first transaction identifier from the web server 140*a*. The user device 120 may receive the data associated with a web page and the transaction identification together or separately. The first transaction identifier may include a unique string of characters and/or numbers. The first transaction identifier may be used to distinguish the user request and the system metrics present during the user request. The system metrics may include system conditions present on the client-side and/or the server-side. The first transaction identifier may be associated with each user action associated with the user device 120 throughout the duration of the session (i.e., from the initial user request until the user logs out of the session). During a session, the first transaction identifier may be associated with one or more interactions with a plurality of web servers 140*a-c*. Therefore, the first transaction identifier may provide tracking of a plurality of user actions which may include interactions with a plurality of web servers.

According to some embodiments, the user device 120 collects session information. The session information may include the client-side metrics. For example, client-side metrics may include a customer identification, a browser type, an operating system type, a web page load time, a graphical user interface (GUI) identification, a user geographical location, and/or the like. The user device 120 may generate a second transaction identifier. The second transaction identifier may have the same or a related character sequence as the received first transaction identifier. The user device 120 may associate the second transaction identifier with the collected session information. In some embodiments, the processor 124 transmits the session identification and the associated transaction identification to analytics server 160. The processor 124 may transmit the session identification and the associated transaction identification to a storage device. The storage device may be associated with the user device 120 and/or a device associated with web server 140*a*.

The processor 124 may also determine the status of the user request. For example, in the case of a user request that includes a request to receive data associated with a web page, the status of the user request may depend on whether the user device 120 has received, from the web server 140*a*, the requested data. When the user device 120 receives, from the web server 140*a*, the data associated with the web page, the processor 124 may transmit, to the web server 140*a*, an indication of a successful request. Conversely, when the user device 120 fails to receive, from the web server 140*a*, the data associated with the web page, the processor 124 may transmit, to the web server 140*a*, an indication of a failed request.

Turning to the web server 140*a*, in some embodiments, the web server 140*a* includes a database 144*a* and a processor 142*a*. According to some embodiments, the web server 140*a* receives a user request for data associated with a web page. The web server 140*a* may determine whether the data associated with the web page resides on the web server 140*a* and/or on the database 144*a* associated with the web server 140*a*. If it is determined that the data does not reside on either the web server 140*a* or the database 144*a*, the web server 140*a* may route the request to, for instance, web server 140*b* and/or web server 140*c*. In response to receiving the user request, one of the one or more web servers 140*a*, 140*b*, and/or 140*c* generates a first transaction identification. Also, in response to receiving the user request the processor 142*a* may collect transaction information (e.g., server-side metrics). In some embodiments, the collector 710 may receive transaction information including server-side metrics from the web server 140. Server-side metrics may include one or more of the following: a pathway of one or more servers accessed in response to the use request; each internet protocol (IP) address corresponding to the one or more servers accessed; a central processing unit (CPU) utilization percentage for each of the one or more servers accessed; and/or bandwidth utilization of the one or more servers accessed during processing of the user request. These server-side metrics are not intended to be exhaustive and may include other collected server-side metrics. The transaction information may be stored in the database 144*a*. In some embodiments, the client-side data may be stored on a second storage device.

The processor 142*a* may associate the transaction identification with the transaction information. Associating the transaction identification with the transaction information may include integrating or combining the transaction identification and the transaction information into a dataset. The processor 142*a* may transmit the transaction identification to the user device 120 and transmit the transaction identification and transaction information to analytics server 160.

The user device 120 sends client-side data associated with the second transaction identification to analytics server 160. The client-side data may include a customer identification, a browser type, an operating system type, a web page load time, a graphical user interface (GUI) identification, and a user geographical location, and/or the like. The analytics server 160 may determine the second transaction identification associated with the client-side data. The analytics server 160 may integrate the server-side metrics and the client-side data (e.g., by identifying traceids associated with each of the server-side metrics and client-side metrics). In some embodiments, the analytics server 160 may compare, for a match or association, the first transaction identification and the second transaction identification. Responsive to finding a match, the analytics server 160 may generate a dataset including the server-side metrics and the client-side data. The analytics server 160 may analyze the integrated server-side metrics and the client-side data.

According to some embodiments, the analytics server 160 receives, from the user device 120, an indication of the status of the user request. For example, the user device 120 (e.g., through embedded application code) may intercept all transactions from and/or from the browser and send the transaction data to the analytics server 160. The user request may include a successful status indication or a failed status indication. Responsive to a failed status indication, the analytics server 160 may further analyze the integrated server-side metrics and the client-side data to identify a source of the failed status indication. Identifying the source of the failed status indication may include comparing the client-side data and the server-side metrics to historic data. The historic data may include one or more previous failed status indications, a plurality of client-side data, a plurality of server-side metrics, and/or the like. The analytics server 160 may identify whether a correlation between the client-side data and the server-side metrics exists leading to previous failed status indications. In response to identifying a correlation, the analytics server 160 may prevent future occurrences of the failed status indication by eliminating the correlation. Eliminating the correlation may include regulating against system conditions representative of the correlation associated with the failed status indication. For example, a CPU utilization rate beyond 85% for a specific server may be identified as a correlation for failed a status indication based on previous failed status indications with the same correlation. To prevent future indications of a failed status, the system may be regulated to direct user requests away from the server exhibiting the correlation. Further, in some embodiments, errors likely to cause a failed status indication may be avoided, in real-time, by dynamically re-routing a request from servers indicating any errors to servers identified as error-free. In some implementations, analytics server 160 may be part of (or otherwise associated with) web server 140*a*.

Figure 2:
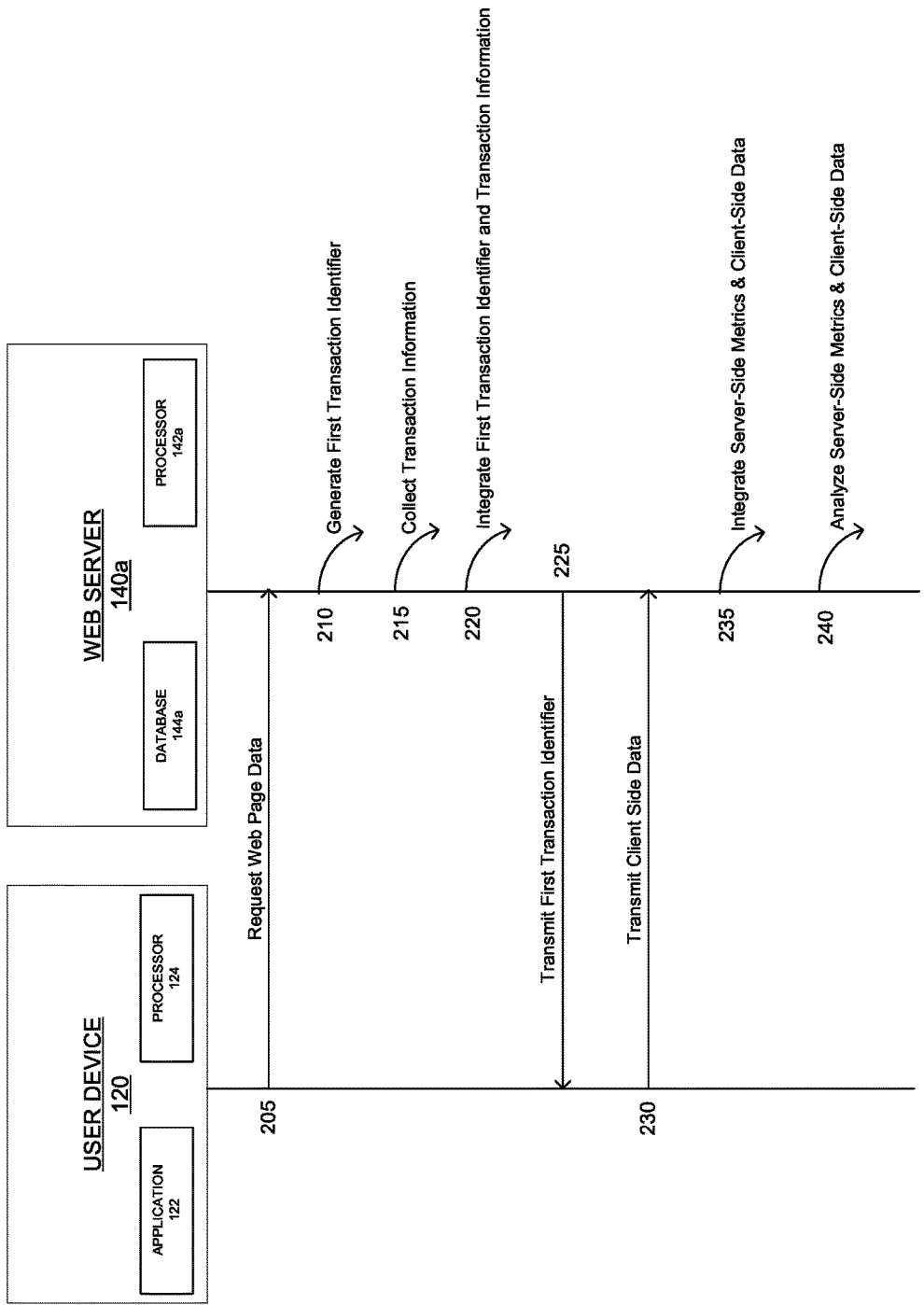
FIG. 2 is an example timing diagram for measuring user and system metrics.

FIG. 2 illustrates an example timing diagram for measuring user and system metrics. According to some embodiments, at 205, the user device 120 requests data associated with a web from the web server 140*a*. The web page data may include code associated with the web page including HTML, Javascript, CSS, CGI, and/or the like. At 210, the processor 142*a* generates a first transaction identifier. The first transaction identifier may represent a unique sequence of characters for the session involving the user request. The processor 142*a* may collect transaction information at 215. The transaction information may include server-side metrics (e.g., one or more servers accessed in response to the user request, internet protocol (IP) address corresponding to the one or more servers, a central processing unit (CPU) utilization percentage for each of the one or more servers, time to return the requested data). At 220, the processor 142*a* may integrate the first transaction identifier with the transaction information. Integrating the first transaction identifier with the transaction information may include incorporating the first transaction identifier and the transaction information within the same dataset. In some embodiments, integrating the first transaction identifier with the transaction information may also include associating a unique hash value with each such that the two fields are retrieved together. At 225, the processor 142*a* transmits the first transaction identifier to the user device 120. The user device 120 may receive the first transaction identifier at processor 124. The user device 120 may collect session information which includes client-side metrics. The client-side metrics may include a customer identification, a browser type, an operating system type, a web page load time, a graphical user interface (GUI) identification, a user geographical location, and/or the like. The processor 124 may associate the session information with the transaction identification.

According to some embodiments and at 230, the processor 124 transmits the client-side data to the web server 140*a*. The client-side data may include the associated session information and transaction identification. At 235, the processor 142*a* integrates the server-side metrics and the client-side data. Integrating the server-side metrics and the client-side data may include associating the server-side metrics and the client-side data within the same dataset. In some embodiments, integrating the server-side metrics and the client-side data may include associating the server-side metrics and the client-side data with the same hash value such that each field may be retrieved together. The integrated server-side metrics and the client-side data may be analyzed by the processor 142*a*, at 240. Analyzing the integrated server-side metrics and the client-side data may include identifying the status of the user request. Further, in the instance of a failed user request, the processor 142*a* may identify a correlation between the client-side data, server-side metrics, and the failed status such that the correlation may be prevented in the future. Prevention may involve preventing the convergence of the identified correlation when a user request is received.

Figure 3:
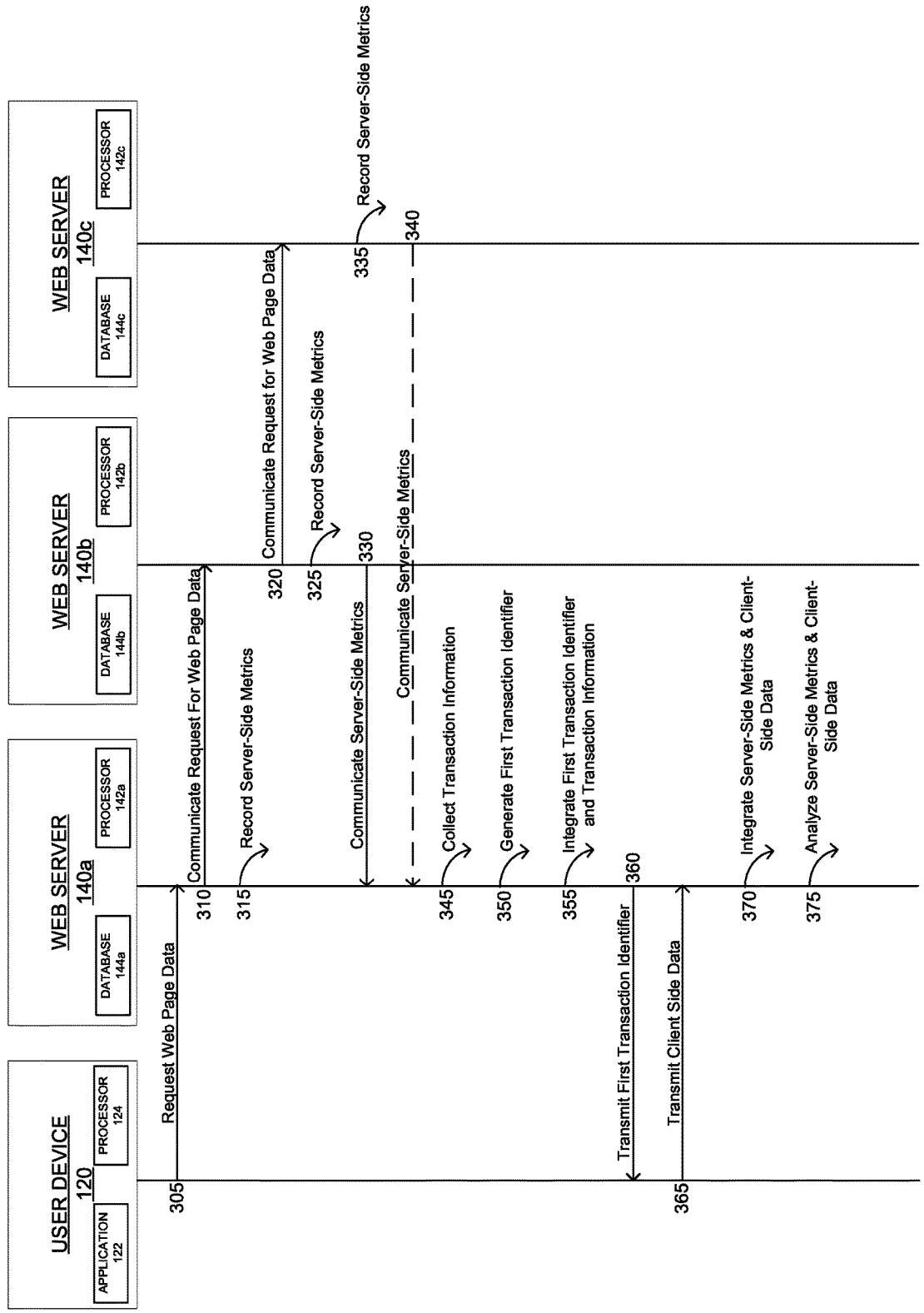
FIG. 3 is an example timing diagram for measuring user and system metrics from amongst a plurality of web servers.

FIG. 3 illustrates an example timing diagram for measuring user and system metrics from amongst a plurality of web servers. At 305, the user device 120 requests web page data from web server 140*a*. Web server 140*a* receives the user request. However, web server 140*a* but does not provide the requested data. This may occur because the web page data is not located on web server 140*a* and/or because another web server is designated to fulfill the user request. The web server 140*a* may communicate the user request for web page data to web server 140*b*, at 310. At 315, web server 140*a* records the server-side metrics present during the user request. The server-side metrics may include an internet protocol (IP) address of web server 140*a*, a central processing unit (CPU) utilization percentage for web server 140*a*, and/or the like. At 320, web server 140*b* communicates the user request for web page data to web server 140*c*. As previously described, web server 140*b* may not provide the requested web page data because the web page data may not be located on web server 140*a* and/or because another web server is designated to fulfill the user request. At 325, web server 140*b* records the server-side metrics present during the user request. The web server 140*b* communicates the recorded server-side metrics present during the user request to web server 140*a*, at 330. At 335, web server 140*c* records the server-side metrics present during the user request. In some embodiments, the web server 140*c* transmits the requested web page data to the user device 120. Transmitting the web page data may include routing the web page data through one or more of the web servers 140*a*, 140*b*, and/or 140*c* and to the user device 120. Transmission of the web page data may also occur as a direct transmission between one of the web servers 140*a*, 140*b*, or 140*c* and to the user device 120.

At 340, web server 140*c* communicates the recorded server-side metrics to web server 140*a*. At 345, web server 140*a* collects transaction information. The processor 142*a* may collect the transaction information by recording server-side metrics of web server 140a. The processor 142a may also collect transaction information by receiving server-side metrics from web server 140b and/or 140c. At 350, the processor 142a generates a first transaction identifier. The processor 142a integrates the first transaction identifier with the collected transaction information at 355. At 360, the processor 142a transmits the first transaction identifier to the user device 120. The user device 120 may receive the first transaction identifier at processor 124. The user device 120 collects session information present during the user request. The session information may include client-side metrics. The client-side metrics may include a customer identification, a browser type, an operating system type, a web page load time, a graphical user interface (GUI) identification, a user geographical location, and/or the like. At 365, the processor 124 transmits the client-side metrics (client-side data) to the web server 140a. The processor 142a, associated with web server 140a, may receive the client-side metrics from processor 124 associated with user device 120. The client-side metrics may be transmitted as one dataset, a plurality of datasets, or as packets of data. In some implementations, the client-side metrics are transmitted asynchronously. At 370, the processor 142a integrates the server-side metrics and the client-side data. In some embodiments, integrating the server-side metrics and the client-side data may include associating the server-side metrics and the client-side data into the same dataset. The integrated server-side metrics and the client-side data may be analyzed by the processor 142a, at 375.

Figure 4:
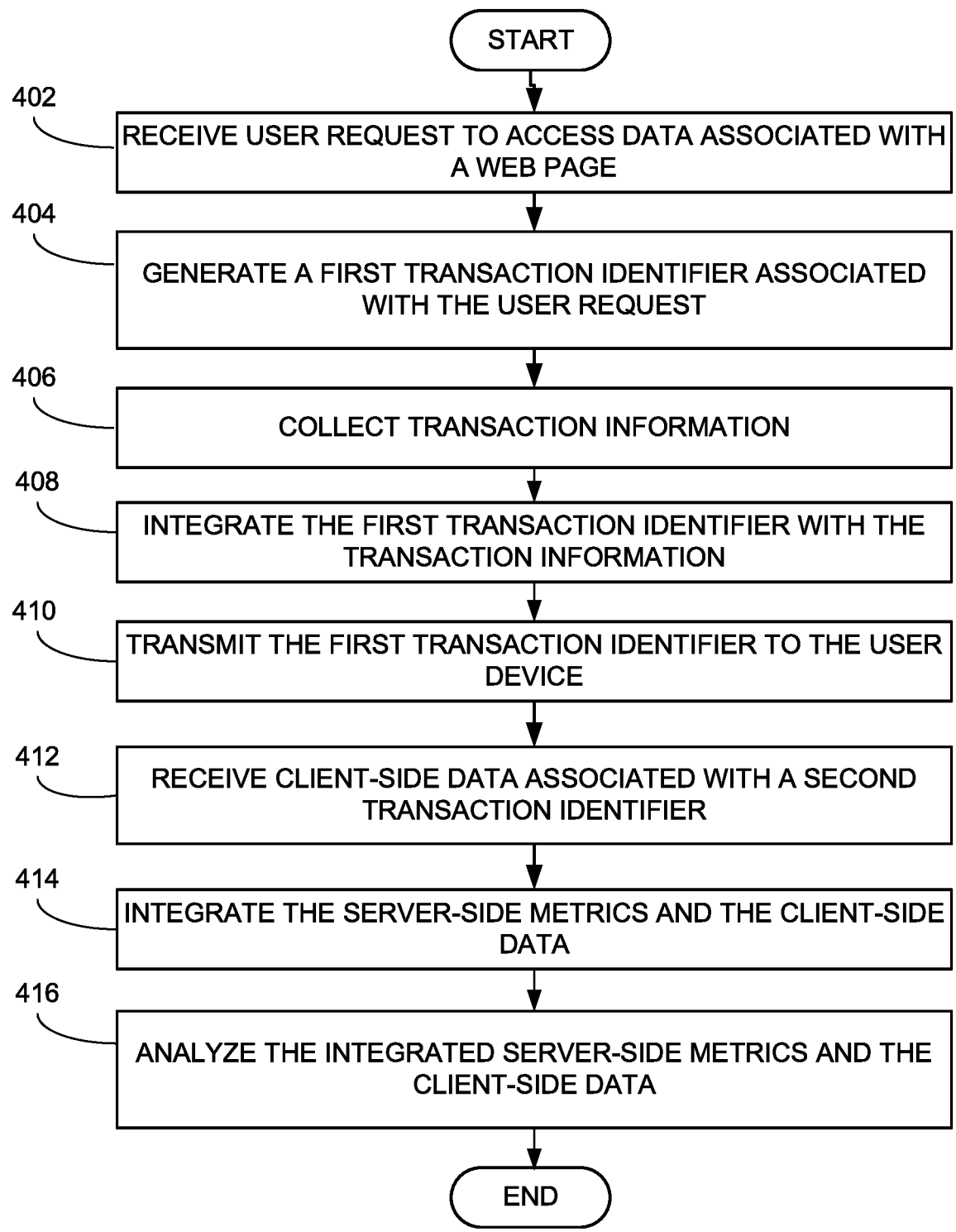
FIG. 4 is an example flow chart of a method for measuring user and system metrics from a server-side perspective.

FIG. 4 illustrates an example flow chart 400 of a method for measuring user and system metrics from a server-side perspective. At 402, web server 140a receives, from user device 120, a user request to access data associated with a web page. A user request to access data associated with a web page may include submission of a URL through a web browser. The data associated with a web page may include HTML, CSS, Javascript, CGI, and/or the like. At 404, the processor 142a generates a first transaction identifier associated with the user request. The first transaction identifier may provide a unique set of characters which may be used to identify the user request. The processor 142a collects transaction information at 406. The transaction information may include server-side metrics. Collecting transaction information may include determining the one or more servers accessed in response to the user request, recording each IP address, CPU utilization percentage, and/or the like, and/or determining an amount of time to return, to the user device 120, the requested data associated with the web page. At 408, the processor 142a integrates the first transaction identifier with the transaction information. Integrating the first transaction identifier may entail including the first transaction identifier in the same dataset as the transaction information.

At 410, the processor 142a transmits the first transaction identifier to user device 120. In some embodiments, the first transaction identifier may be transmitted to the user device 120 along with the requested data associated with the web page. In other embodiments, the requested data associated with the web page may be transmitted, to the user device 120, separately from the first transaction identifier. At 412, the web server 140a receives, from user device 120, client-side data associated with a second transaction identification. In some embodiments, the processor 124 associated with user device 120 may output, for transmission, the client-side data to web server 140a. The client-side data may include a customer identification, a browser type, an operating system type, a web page load time, a graphical user interface (GUI) identification, a user geographical location, and/or the like. In some embodiments, the processor 142a may determine the second transaction identifier associated with the client-side data. The processor 142a may compare, for a match, the first transaction identification and the second transaction identification. Responsive to finding a match, at 414, the processor 142a integrates the server-side metrics and the client-side data. Integrating the server-side metrics and the client-side data may include the processor 142a generating a dataset comprising the server-side metrics and the client-side data. According to some embodiments, the transaction information may be stored on a first storage device. For example, the transaction information may be stored within database 144a. The client-side data may be stored on a second storage device. For example, the client-side data may be stored within a database associated with the user device 120.

At 416, the processor 142a analyzes the integrated server-side metrics and the client-side data. In some embodiments, the processor 142a receives, from the user device, an indication of the status of the user request, the user request comprising a successful status indication or a failed status indication. Responsive to a failed status indication, the processor 142a identifies a source of the failed status indication. Identifying a source of the failed status indication may include comparing, by the processor 142a, the client-side data and the server-side metrics to historic data, to identify whether a correlation between the client-side data and the server-side metrics exists leading to the failed status indication. The historic data may include a plurality of client-side data and a plurality of server-side metrics. In response to identifying a correlation, the processor 142a may prevent future occurrences of the failed status indication by eliminating the occurrence of the correlation.

Figure 5:
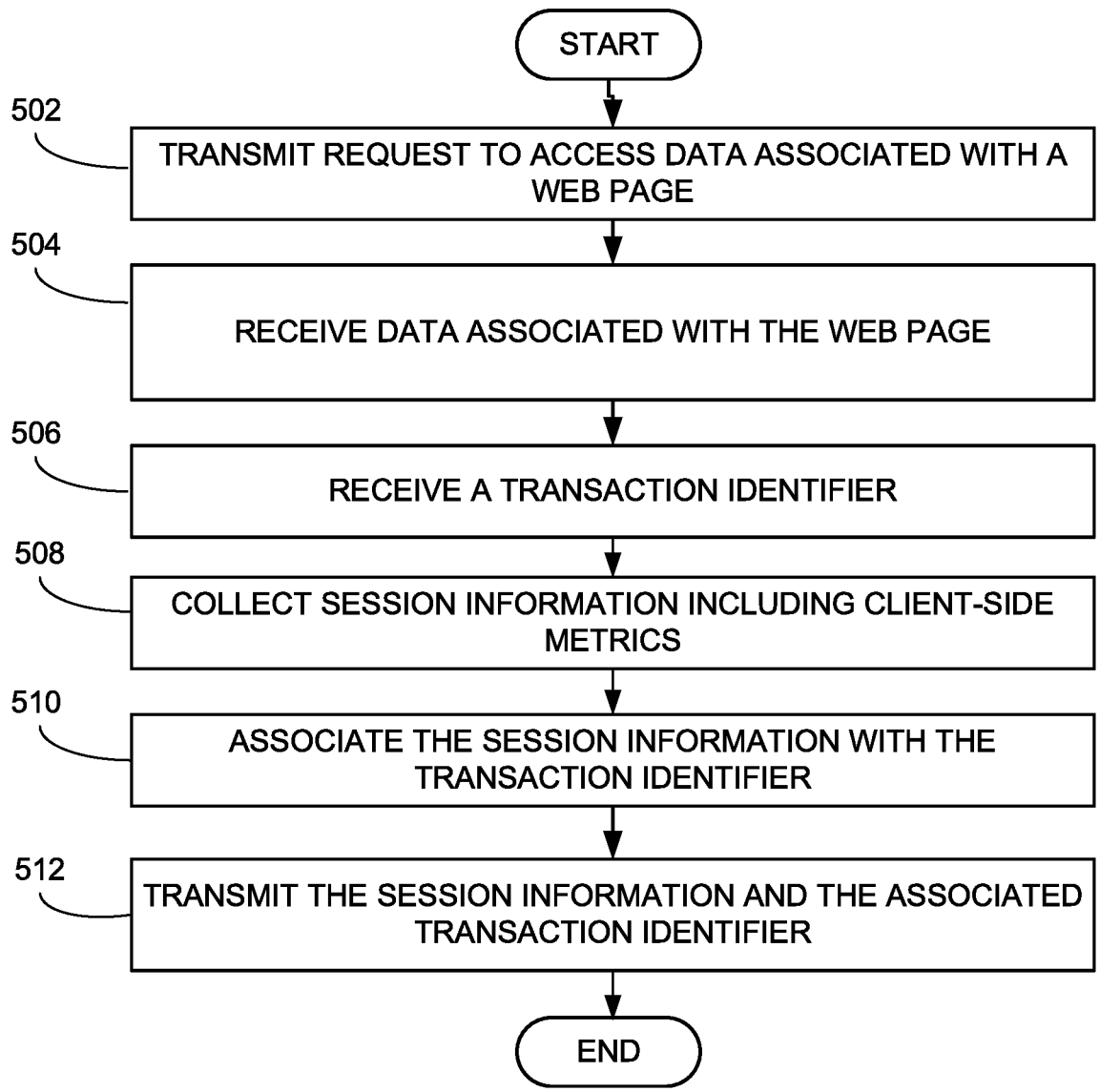
FIG. 5 is an example flow chart of a method for measuring user and system metrics from a client-side perspective.

FIG. 5 illustrates an example flow chart 500 of a method for measuring user and system metrics from a client-side perspective. At 502, the processor 124 associated with user device 120 transmits, to web server 140a, a request to access data associated with a web page. In some embodiments, the processor 142a associated with web server 140a transmits the data associated with the web page to the user device 120. At 504, the user device 120 received data associated with the web page. The data associated with the web page may be received by the processor 124 associated with user device 120. At 506, the user device 120 may receive a transaction identifier from the web server 140a. In some embodiments, the user device 120 may receive the transaction identifier and the data associated with the web page together. The user device 120 collects session information which may include client-side metrics, at 508. In some embodiments, the processor 124 may collect the session information. The client-side metrics may include a customer identification, a browser type, an operating system type, a web page load time, a graphical user interface (GUI) identification, a user geographical location, and/or the like. At 510, the processor 124 associates the session information with the transaction identification. Associating the session information with the transaction identification may entail including the session information and the transaction identification in the same dataset. At 512, the processor 124 transmits the session information and the associated transaction identification to the web server 140a. In some embodiments, the processor 124 transmits the session information and the associated transaction identification to a storage device. The storage device may include a database 144a associated with the web server and/or a database associated with the user device 120. According to some embodiments, the processor 124 may determine the status of the request. The processor 124 may also transmit an indication of the status of the request to web server 140a. The status of the request may include a successful status indication or a failed status indication.

Figure 6:
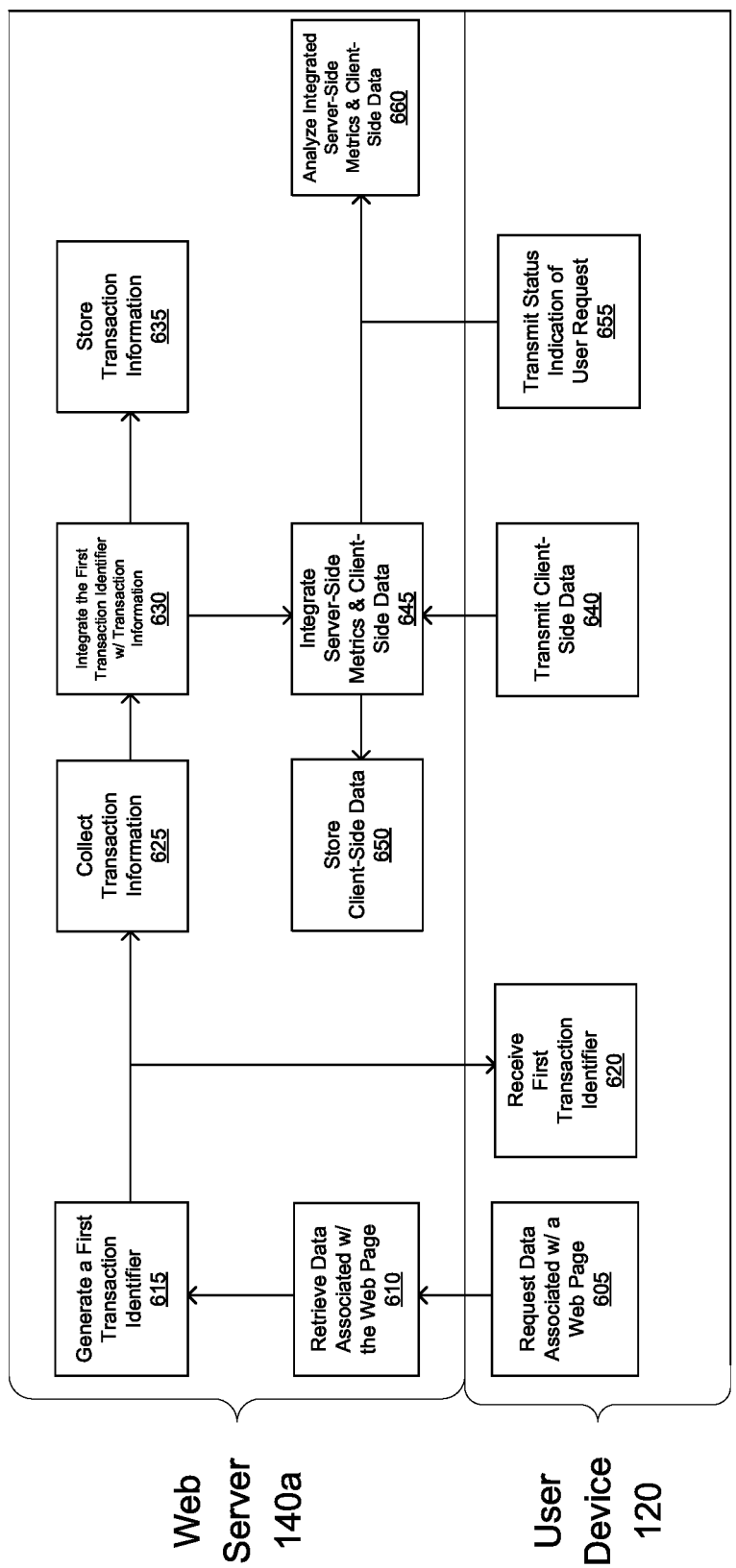
FIG. 6 is an example of a process flow diagram of a method for measuring user and system metrics.

FIG. 6 is an example of a process flow diagram 600 of a method for measuring user and system metrics. At 605, the user device 120 requests data associated with a web page from the web server 140a. The web server 140a retrieves data associated with the web page at 610. In some embodiments, the processor 142a retrieves the data associated with the web page from database 144a. At 615, the web server 140a generates a first transaction identifier. The first transaction identifier may be a unique sequence of characters associated with the user request. According to some embodiments, the processor 142a associated with web server 140a generates the first transaction identifier. At 620, the user device 120 receives the first transaction identifier from web server 140a. The processor 142a associated with web server 140a may generate the first transaction identifier.

At 625, the web server 140a collects transaction information. The transaction information includes server-side metrics collected during the user request. The server-side metrics may include the servers accessed in response to the user request, the CPU utilization rate and IP address for each server accessed, the return time for the request, and/or the like. At 630, the processor 142a integrates the first transaction identifier with the collected transaction information. Integrating the first transaction identifier with the collected transaction information may entail including the first transaction identifier and the collected transaction information in the same dataset. At 635, the web server 140a stores the collected transaction information. The collected transaction information may be stored at database 144a. The collected transaction information may be stored amongst historic data including previous client-side data and/or previous server-side metrics. The user device 120 transmits client-side data to the web server 140a, at 640. In some embodiments, processor 124 associated with user device 120 transmits the client-side data. The client-side data may include a customer identification, a browser type, an operating system type, a web page load time, a graphical user interface (GUI) identification, a user geographical location, and/or the like. The client-side data may be associated with a second transaction identifier. The second transaction identifier may be generated by the user device 120 as a sequence of characters similar to or the same as the received first transaction identifier.

At 645, the processor 142a integrates the server-side metrics with the client-side data. Integrating the server-side metrics with the client-side data may involve including the server-side metrics and the client-side data in the same dataset. According to some embodiments, the processor 142a integrates the server-side metrics with the client-side data responsive to the processor 142a finding a match (or designated or determined association) between the first transaction identifier and the second transaction identifier. The client-side data may be stored at database 144a, at 650. The stored client-side data may include the second transaction identifier. At 655, the user device 120 transmits an indication of the status of the user request to the web server 140a. The indication of the status of the user request may be a successful status indication or a failed status indication. At 660, the processor 142a analyzes the integrated server-side metrics and the client-side data. In some embodiments, in response to a failed status indication, the processor 142a identifies the source of the failed status indication. Identifying the source of the failed status indication may include comparing, the client-side data and the server-side metrics to historic data, to identify whether a correlation between the client-side data and the server-side metrics exists leading to the failed status indication. Future occurrences of the failed status indication may occur by eliminating the correlation. The web server 140a may store the source of the failed status indication, and the client-side data and the server-side metrics associated with the user request.

In some cases, analytics server 160 (e.g., as part of web server 140a), may generate a graphical user interface (GUI) including, for example, representations of the client-side data and/or the server-side metrics. The GUI may be configured to provide performance metrics, network latency, and/or browser latency as a single panel metric seamless view. In some cases, the metrics may be displayed in an overlaid timeline. Detected errors may be mapped to the metrics (e.g., with pop-outs, symbols, or other indicators). In some cases, correlations between the various metrics and errors may be automatically detected and displayed. In other instances, the GUI may be configured to receive input (e.g., user input) to identify specific combinations of metrics to avoid (e.g., if a user identifies, within the GUI representation, certain groupings of metrics occurring before errors).

Figure 7:
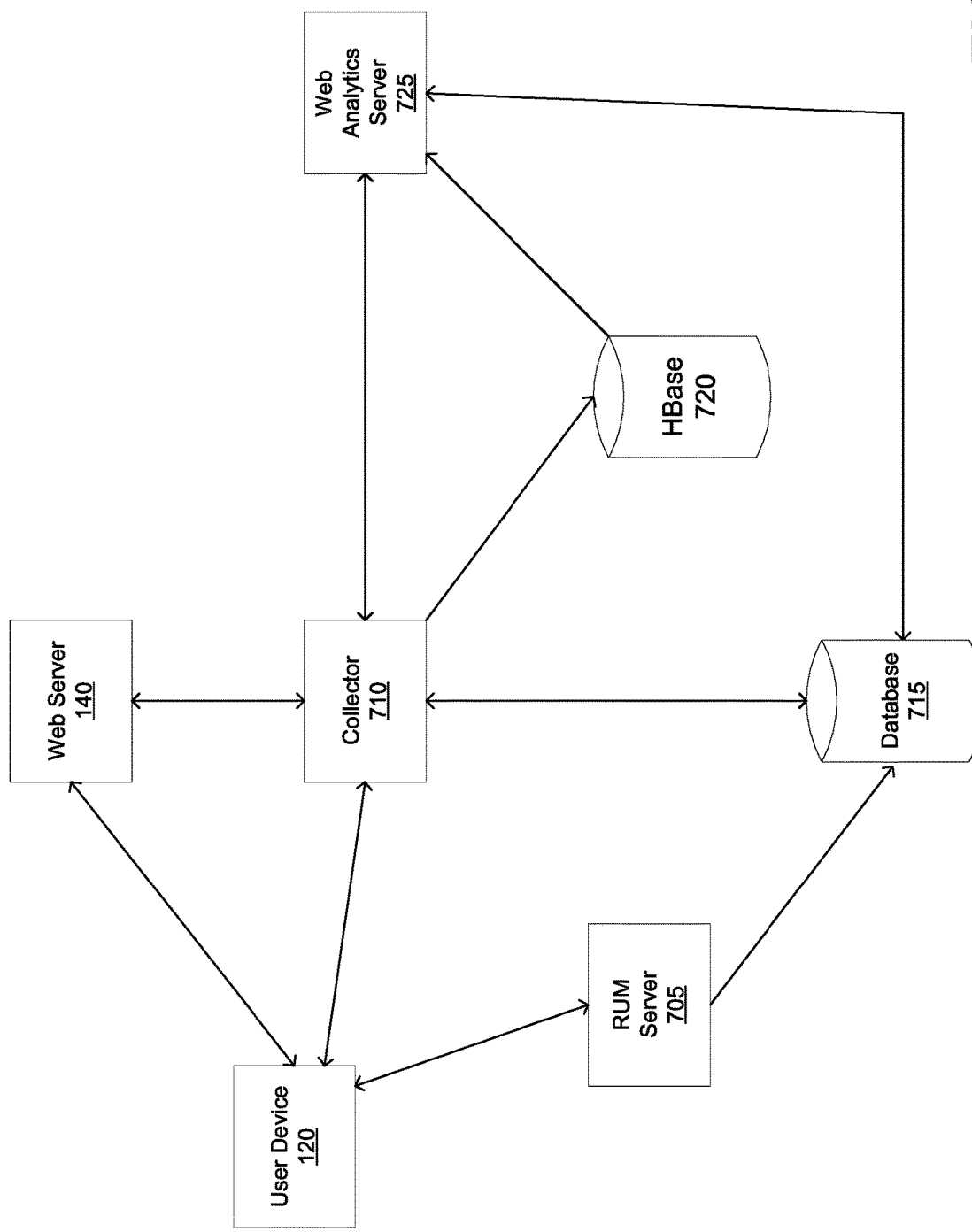
FIG. 7 is a diagram of an example environment that may be used to implement one or more embodiments of the present disclosure.

FIG. 7 shows a diagram of an example environment that may be used to implement one or more embodiments of the present disclosure. The components and arrangements shown in FIG. 7 are not intended to limit the disclosed embodiments as the components used to implement the disclosed processes and features may vary. As shown in FIG. 7, in some implementations the environment 700 includes one or more user devices 120, one or more web servers 140, one or more real user monitoring (RUM) servers 705, one or more collectors 710, one or more databases 715, one or more HBase databases 720, and one or more web analytics servers 725. As non-limiting examples, the user device 120 may be a personal computer, a smartphone, a laptop computer, a tablet, or other personal computing device. The web server 140 may include one or more physical or logical devices (e.g., servers). A non-limiting example computer architecture that may be used to implement one or more of the user device 120, web server 140, RUM servers 705, collectors 710, databases 715, HBase databases 720, and web analytics servers 725 is described below with reference to FIG. 8.

According to some embodiments, the user device 120 submits a user request for data associated with a web page to the web server 140. The user device 120 receives a unique identification from the RUM server 705. The user device 120 may transmit client-side data associated with the user request to the RUM server 705. The unique identification may be used to identify client-side data collected by the RUM server 705. In some embodiments, the user device 120 may receive a transaction identification from the collector 710.

The RUM server 705 may collect client-side data. The RUM server 705 may receive client-side data from user device 120. In some embodiments, the RUM server 705 may generate and transmit a unique identification to the user device 120. After transmitting the unique identification to the user device 120, the RUM server 705 may receive the unique identification back from the user device 120 together with associated client-side data. The RUM server 705 may transmit the client-side data to the database 715 to be stored.

In some embodiments, the collector 710 collects transaction information including server-side metrics (e.g., from the web server 140). The collector 710 may also receive a first transaction identification from the web server 140 associated with the transaction information. The collector 710 may also receive the first transaction identification and a second transaction identification from the user device 120. The collector 710 may store transaction information including server-side metrics at database 715 and/or HBase database 720 associated with the first transaction identification. The collector 710 may retrieve historic data including client-side data and transaction information from database 715. Further, the collector 710 may retrieve historic data including transaction information from HBase database 720.

Web analytics server 725 receives client-side data and transaction information including server-side metrics from the collector 710. The client-side data and transaction information received from the collector 710 may be received as it is collected (e.g., in real- or near-real-time). The web analytics server 725 may also receive historic data including transaction information from HBase database 720. Also, the analytics server 725 may receive historic data including client-side data and transaction information from database 715. The web analytics server 725 may analyze the client-side data, transaction information including server-side metrics, and/or historic data to identify correlations. Based on identified correlations, the web analytics server 725 may determine the cause of a failed status indication of a user request.

Figure 8:
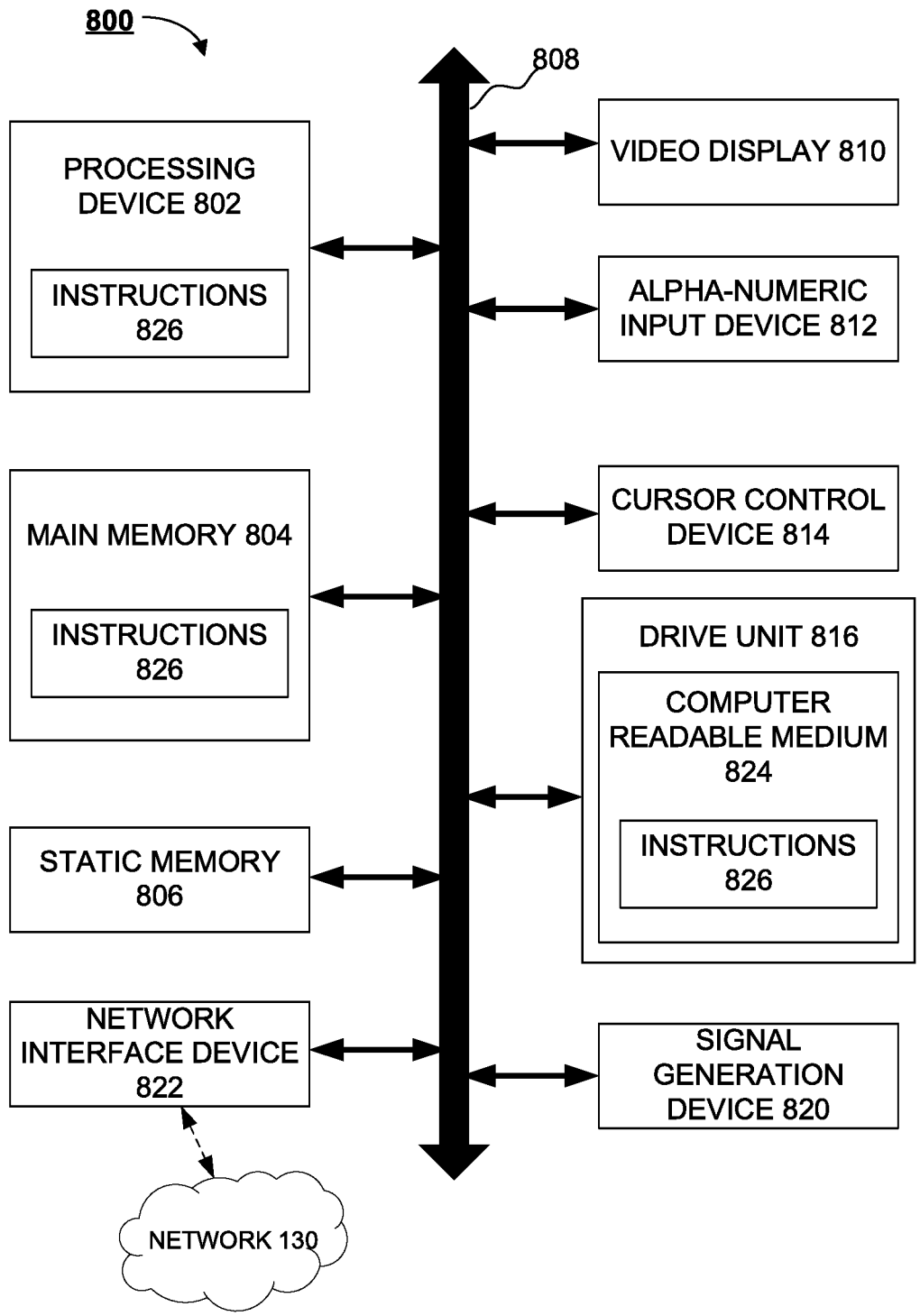
FIG. 8 is a block diagram of an example computer system that may implement certain aspects of the present disclosure.

FIG. 8 is a block diagram of an example computer system 800 that may implement certain aspects of the present disclosure. The computer system 800 may include a set of instructions 826 for controlling operation of the computer system 800. In some implementations, the computer system 800 may be connected (e.g., networked) to other machines in a Local Area Network (LAN), an intranet, an extranet, a satellite communications system, or the Internet. The computer system 800 may operate in the capacity of a server or a client machine in a client-server network environment, or as a peer machine in a peer-to-peer (or distributed) network environment. The computer system 800 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 800 is illustrated, the term "machine" shall also be taken to include any collection of machines (e.g., computers) that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random-access memory (DRAM) such as synchronous DRAM (SDRAM), etc.), a static memory 806 (e.g., flash memory, static random-access memory (SRAM), etc.), and a secondary memory 816 (e.g., a data storage device), which communicate with each other via a bus 808.

The processing device 802 represents one or more general-purpose processing devices such as a microprocessor, a microcontroller, a central processing unit, or the like. As non-limiting examples, the processing device 802 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the operations for electronically creating and trading derivative products based on one or more indices relating to volatility.

The computer system 800 may further include a network interface device 822, which may be connectable to a network 130. The computer system 800 also may include a display unit 810, i.e., a display (e.g., a liquid crystal display (LCD), a touch screen, a graphical user interface (GUI), or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a non-transitory storage medium 824 on which may be stored one or more sets of instructions 826 for the computer system 800 representing any one or more of the methodologies or functions described herein. For example, the instructions 826 may include instructions for implementing an asset tracking device including a power source and power management system or subsystem for a container or a trailer. The instructions 826 for the computer system 800 may also reside, completely or at least partially, within the main memory 804 and/or within the processing device 802 during execution thereof by the computer system 800, the main memory 804 and the processing device 802 also constituting computer-readable storage media.

While the storage medium 824 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a particular implementation of measuring user and system metrics. This is intended solely for explanatory purposes and not limitation. In one case, a web site owner seeks to improve the efficiency of content delivered to web site visitors. The web site owner opens a portal from his computer. The portal provides insight into the web site visitor's interaction with the web site. For instance, the web site owner views an interaction of a particular web site visitor. While using his laptop (e.g., user device 120), the web site visitor enters the web site's URL in his browser (or otherwise navigates to the URL). The host server (e.g., web server 140) receives the request. In response, the host server collects the IP address and CPU utilization rate associated with the host server. Also, the host server requests information associated with the laptop (e.g., a customer identification, a browser type, an operating system type, a web page load time, a graphical user interface (GUI) identification, and a user geographical location). The host server transmits the data associated with the web site to the laptop. The host server receives a notification that the web site visitor did not receive the web site as requested. The host server analyzes the data collected by the host server, the data collected by the laptop, and previous data to determine whether a correlation exists. The host server identifies the following data with previous failed web site requests: a CPU utilization rate beyond 95%; and the web site request from a Safari browser. Accordingly, the host server identifies the correlation as the source of the failed web site request. The source of the failed web site request may be displayed on the portal. Further, the future occurrences of the failed web site request may be reduced by eliminating the source in the future (e.g., by rerouting future requests based on browser and CPU utilization rate).

What is claimed is:

1. A method for measuring user and system metrics, the method comprising:

receiving, from a user device, a first user request to access data associated with a web page;
generating, by a processor, a first transaction identification;
collecting transaction information generated in response to the first user request, the transaction information comprising server-side metrics;
integrating, by the processor, the first transaction identification with the transaction information;
transmitting, by the processor, the first transaction identification to the user device;
receiving, from the user device, client-side data associated with a second transaction identification;
integrating, by the processor, the server-side metrics and the client-side data;
analyzing, by the processor, the integrated server-side metrics and the client-side data;
receiving, from the user device, a second request; and
selectively re-routing the second user request based at least in part on the analyzed integrated server-side metrics and the client-side data.

2. The method of claim 1 further comprising:
determining one or more servers accessed in response to the first user request;
recording each internet protocol (IP) address corresponding to the one or more servers accessed in response to the first user request; and
associating each IP address recorded with the server-side metrics.

3. The method of claim 1 further comprising:
determining one or more servers accessed in response to the first user request;
recording a central processing unit (CPU) utilization percentage for each of the one or more servers accessed in response to the first user request; and
associating each CPU utilization percentage recorded with the server-side metrics.

4. The method of claim 1 further comprising:
determining an amount of time to return, to the user device, the data associated with the web page; and
associating the amount of time to return the data associated with the web page with the server-side metrics.

5. The method of claim 1, wherein the client-side data comprises at least one of a customer identification, a browser type, an operating system type, a web page load time, a graphical user interface (GUI) identification, and a user geographical location.

6. The method of claim 1 further comprising:
determining, by the processor, the second transaction identification associated with the client-side data;
comparing, by the processor and to determine a match, the first transaction identification and the second transaction identification; and
in response to finding a match, generating, by the processor, a dataset comprising the server-side metrics and the client-side data.

7. The method of claim 1, wherein the transaction information is stored on a first storage device.

8. The method of claim 1, wherein the client-side data is stored on a second storage device.

9. The method of claim 1 further comprising:
receiving, from the user device, an indication of a status of the user request, the indication comprising a successful status indication or a failed status indication.

10. The method of claim 9 further comprising:
responsive to receiving the failed status indication, identifying a source of the failed status indication; and storing the source of the failed status indication, and the client-side data and the server-side metrics corresponding to the first transaction identification, wherein the second user request is re-routed to prevent the re-occurrence of the client-side data and the server-side metrics corresponding to the first transaction identification.

11. The method of claim 10 further comprising responsive to receiving the failed status indication:

comparing, the client-side data and the server-side metrics to historic data, to identify whether a correlation between the client-side data and the server-side metrics exists leading to the failed status indication; and in response to identifying that the correlation exists, preventing future occurrences of the failed status indication by eliminating the correlation.

12. The method of claim 11, wherein the historic data comprises a plurality of client-side data and a plurality of server-side metrics.

13. A system for measuring user and system metrics, the system comprising:

one or more processors; and a memory in communication with the one or more processors and storing instructions that, when executed by the one or more processors, are configured to cause the system to:

receive, from a user device, a user request to access data associated with a web page;

generate a first transaction identification;

collect transaction information, the transaction information comprising server-side metrics;

integrate the first transaction identification with the transaction information;

transmit the first transaction identification to the user device;

receive, from the user device, client-side data associated with a second transaction identification;

integrate the server-side metrics and the client-side data; and analyze the integrated server-side metrics and the client-side data.

14. The system of claim 13 further comprising:

receiving, from the user device, an indication of a status of the user request, the user request comprising a successful status indication or a failed status indication.

15. The system of claim 14 further comprising:

responsive to receiving the failed status indication:

comparing, the client-side data and the server-side metrics to historic data, to identify whether a correlation between the client-side data and the server-side metrics exists leading to the failed status indication; and in response to identifying that the correlation exists, preventing future occurrences of the failed status indication by eliminating the correlation.

* * * * *